(12) United States Patent
Yamazaki et al.

(10) Patent No.: US 11,105,407 B2
(45) Date of Patent: Aug. 31, 2021

(54) GEAR

(71) Applicant: KAWASAKI JUKOGYO KABUSHIKI KAISHA, Kobe (JP)

(72) Inventors: Yuji Yamazaki, Akashi (JP); Hirofumi Akahori, Akashi (JP); Kazuhiro Sato, Akashi (JP); Souichiro Ohsugi, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 91 days.

(21) Appl. No.: 16/710,900

(22) Filed: Dec. 11, 2019

(65) Prior Publication Data
US 2020/0116247 A1 Apr. 16, 2020

Related U.S. Application Data

(63) Continuation of application No. PCT/JP2018/022879, filed on Jun. 15, 2018.

(30) Foreign Application Priority Data

Jun. 16, 2017 (JP) .............................. JP2017-118309

(51) Int. Cl.
*F16H 55/17* (2006.01)
(52) U.S. Cl.
CPC .................................. *F16H 55/17* (2013.01)
(58) Field of Classification Search
CPC ..... F16H 55/17; F16H 55/31; F16H 2001/328
USPC ......................................................... 74/434
See application file for complete search history.

(56) References Cited

U.S. PATENT DOCUMENTS 3,226,996 A 1/1966 Breuer
9,482,334 B2 * 11/2016 Buchleitner ............ F16H 55/17

FOREIGN PATENT DOCUMENTS

| EP | 1 939 492 A2 | 7/2008 |
| EP | 2 005 034 A1 | 12/2008 |
| JP | 09-119507 A | 5/1997 |
| JP | 10-305701 A | 11/1998 |

(Continued)

OTHER PUBLICATIONS

Nobuyoshi Yamauchi, "Development of BK117 Helicopter: Design and Type Certification (Part 9)," Japan Aeronautical Engineers' Association, Aeronautics, Jul. 2015, pp. 42-49, No. 724.

(Continued)

*Primary Examiner* — Hoan H Tran
(74) *Attorney, Agent, or Firm* — Sughrue Mion, PLLC (57) ABSTRACT

A gear including: a hub provided on an inner peripheral side and configured to be connected to a main shaft; a rim provided on an outer peripheral side and formed with external teeth; and a gear web connecting the hub and the rim. The gear web includes a first web extending obliquely upward from the rim to the hub; and a second web extending obliquely downward from the rim to the hub. The first web includes a plurality of first web pieces formed so as to be spaced apart in a circumferential direction, and the second web includes a plurality of second web pieces formed so as to be spaced apart in the circumferential direction. The first web pieces and the second web pieces are alternately arranged in the circumferential direction and are located at mutually different circumferential positions.

12 Claims, 4 Drawing Sheets

(56) References Cited

FOREIGN PATENT DOCUMENTS

JP          3589516 B2    11/2004
JP      2011-174526 A     9/2011

OTHER PUBLICATIONS

DuPont, "General Design Principles for DuPont Engineering Polymers (Design guide—Module 1)", Jan. 1, 2000, http://plastics.dupont.com/plastics/pdflit/americas/general/H76838.pdf (136 pages total).

* cited by examiner

GEAR

CROSS REFERENCE TO THE RELATED APPLICATION

This application is a continuation application, under 35 U.S.C. § 111(a) of international patent application No. PCT/JP2018/022879, filed Jun. 15, 2018, which claims priority to Japanese patent application No. 2017-118309, filed Jun. 16, 2017, the entire disclosures of all of which are herein incorporated by reference as a part of this application.

BACKGROUND OF THE INVENTION

Field of the Invention

The present invention relates to, for example, a gear used for a drive system of an aircraft.

Description of Related Art

As an example of a drive system for an aircraft, a gear has been known in which: a hub is provided on an inner peripheral side and is configured to be coupled to a rotation shaft; a rim is provided on an outer peripheral side and is formed with external teeth; and the hub and the rim are connected by a gear web extending obliquely toward both sides in an axial direction (for example, Non-Patent Document 1). The gear web is configured to support engagement load on the external teeth and transmit the load from the external teeth to the rotation shaft. Suppression of deformation of the gear web when supporting the load makes it possible to provide large tooth contact of the external teeth. This is advantageous in ensuring durability of the external teeth. In Non-Patent Document 1, the gear web is constituted of two divided bodies in the axial direction, and the two divided bodies are coupled with each other by a fastening member, such as a bolt. According to this configuration, the coupling between the two divided bodies forms the gear web extending obliquely toward both sides in the axial direction, thereby achieving high rigidity. As a result, it is possible to suppress deformation of the gear web.

RELATED DOCUMENT

Non-Patent Document

[Non-Patent Document 1] Nobuyoshi Yamauchi, "Development of BK117 Helicopter: Design and Type Certification (Part 9)," Japan Aeronautical Engineers' Association, Aeronautics, July 2015 Issue, No. 724, pages 42-49

Such a gear as in Non-Patent Document 1, however, has a large number of parts. Thus, such a gear is complicated to assemble, resulting in high manufacturing cost. Additionally, in order to couple the two divided bodies, it is necessary to secure a part where the two members are overlapped, which makes it difficult to reduce the weight.

On the other hand, it is known to couple the upper and lower divided bodies by use of electron beam welding, instead of using a fastening member. This configuration makes it possible to omit such a fastening member to simplify the structure as well as to reduce the weight. However, even where electron beam welding is employed, the structure includes many parts because the structure is still constituted of the two upper and lower divided bodies, and also, the structure requires post-welding processes. Thus, the manufacturing cost is increased due to the increased number of processes.

SUMMARY OF THE INVENTION

An object of the present invention is to provide a light-weight and highly-rigid gear that has a reduced number of parts and can be manufactured at low cost.

In order achieve to the above object, a gear according to the present invention includes: a hub provided on an inner peripheral side and configured to be connected to a rotation shaft; a rim provided on an outer peripheral side and formed with external teeth; a first web connecting the hub and the rim and extending obliquely toward one side of the rotation shaft in an axial direction from the rim to the hub; and a second web connecting the hub and the rim and extending obliquely toward the other side of the rotation shaft in the axial direction from the rim to the hub. The first web includes a plurality of first web pieces formed so as to be spaced apart in a circumferential direction, and the second web includes a plurality of second web pieces formed so as to be spaced apart in the circumferential direction. The first web pieces and the second web pieces are alternately arranged in the circumferential direction and are located at mutually different circumferential positions or circumferential portions different to each other.

According to this configuration, the first web and the second web that obliquely extend from the rim to the hub in mutually different directions make it possible to ensure rigidity of the gear. Moreover, the first web pieces and the second web pieces are alternately arranged in the circumferential direction and are located at mutually different circumferential positions. Thus, the gear can be formed in an integrated structure, thereby making it possible to reduce the number of parts as well as to reduce manufacturing cost.

According to the above configuration, spaces are defined at the other side in the axial direction with respect to the first web and at the one side in the axial direction with respect to the second web. This configuration can suppress weight increase in the entire web including the first web and the second web. As a result, it is possible to reduce the weight of the gear. Thus, the above configuration makes it possible to reduce the number of parts as well as to manufacture a light-weight and highly-rigid gear at low cost.

In the present invention, each of the first web pieces and the second web pieces may have a circumferentially elongated cross section along the circumferential direction. This configuration makes it possible to ensure rigidity against radial load and circumferential load on the first web pieces and the second web pieces.

In the present invention, an entirety of the first web pieces excluding connection portions to the rim may be separated toward the one side in the axial direction with respect to an entirety of the second web pieces excluding connection portions to the rim. According to this configuration, since the first and second web pieces extend obliquely so as to be separated from each other in the axial direction, rigidity of the gear can be ensured.

Where the entirety of the first web pieces is separated toward the one side in the axial direction with respect to the entirety of the second web pieces, the connection portions of the first web pieces to the rim may be axially separated from the connection portions of the second web pieces to the rim. This configuration allows the first web pieces and the second web pieces to be shorter, which makes it possible to suppress weight increase in the first and second webs. As a result, the weight of the gear can be reduced.

In the present invention, the connection portions of the first web pieces to the rim and the connection portions of the second web pieces to the rim may be located at the same position in the axial direction. The expression "the same position" used herein means that their axial positions are exactly the same or are offset by 5% or less of an axial width of the rim. According to this configuration, when viewed from a radial direction, the first web pieces and the second web pieces define triangles each having a vertex at the connection portions to the rim, thereby enhancing the rigidity of the gear.

In the present invention, a maximum value of an axial interval between each of the first web pieces and each of the second web pieces may be 80% or more of the axial width of the rim. According to this configuration, an axial height of a base of a triangle or a trapezoid, which is viewed from the radial direction, is made larger, thereby enhancing the rigidity of the gear.

In the present invention, the first web pieces and the second web pieces that are adjacent in the circumferential direction may be connected by connection walls extending in the axial direction. According to this configuration, the rigidity of the gear can be further enhanced thanks to the connection walls.

In the present invention, the rim may have a flange protruding radially inward, and the flange may be connected with radially outer end portions of the first web pieces and the second web pieces. According to this configuration, since the first web pieces and the second web pieces have radial lengths that are shorter by a length of the flange, an amount of machine processing to these web pieces is reduced. As a result, the manufacturing cost of the gear can be reduced.

In the present invention, the external teeth may be, for example, in the form of a helical gear or a bevel gear. Although a helical gear or a bevel gear is subjected to a load in an axial direction, a highly rigid gear of the present invention can sufficiently bear such a load. In the case of a helical gear or a bevel gear, the first web pieces and the second web pieces may have different thicknesses from each other in accordance with a magnitude of axial load to be applied. According to this configuration, the thicknesses of the first web pieces and the second web pieces can be varied in accordance with the axial load to be applied from the helical gear or the bevel gear. Thus, it is possible to suppress weight increase while ensuring necessary rigidity.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF THE EMBODIMENTS

Figure 1:
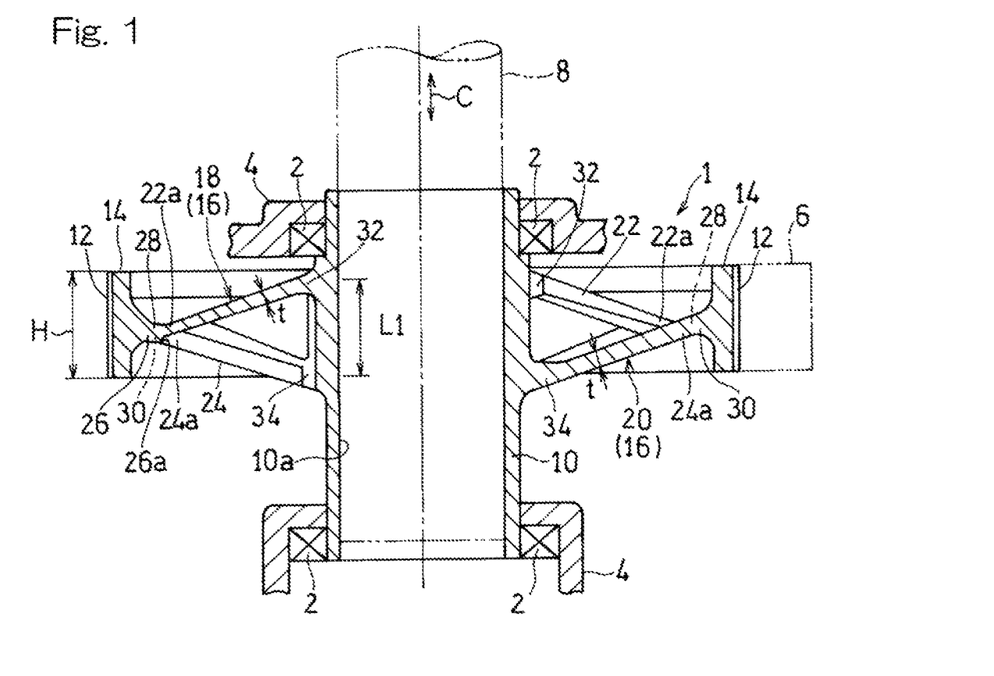
FIG. 1 is a longitudinal sectional view of a gear according to a first embodiment of the present invention.

Hereinafter, reference is made to the drawings to describe embodiments. FIG. 1 shows an example of a gear according to a first embodiment, the gear being applied to a speed reduction device that forms a part of a drive system of a helicopter. A gear 1 of this embodiment is rotatably supported by a speed reduction device casing 4 via bearings 2. The gear 1 is configured to reduce a speed of rotation of an engine (not illustrated) inputted through an input gear 6 so as to transmit the rotation to a main shaft 8 that is a rotation shaft of a main rotor. The main shaft 8 constitutes a rotation shaft coupled to the gear 1 in a mutually non-rotatable manner. The rotation shaft rotates about an axial direction C. Hereinafter, the expressions "radial direction" as well as "circumferential direction" refer to a radial direction and a circumferential direction with respect to the axial direction C, respectively, unless specifically indicated otherwise. Similarly, the expressions "inner periphery" as well as "outer periphery" refer to an inner periphery and an outer periphery with respect to the axial direction C, respectively, unless specifically indicated otherwise.

The gear 1 shown in FIG. 1 includes: a hub 10 provided on an inner peripheral side and coupled to the main shaft 8; a rim 14 provided on an outer peripheral side and formed with external teeth 12 to be gear-coupled to the input gear 6; and a gear web 16 connecting the hub 10 and the rim 14. The rim 14 has an annular shape that is concentric to the hub 10.

The hub 10 is formed in a cylindrical shape expending in the axial direction C and has a hollow hole 10a. The hub 10 is provided so as to be coaxial with the main shaft 8 and is formed on the inner peripheral side of the gear 1. The hub 10 is rotatably supported on an upper portion (i.e., on one side) and on a lower portion (i.e., on the other side) thereof in the axial direction C, by the speed reduction device casing 4 via the bearings 2. In this embodiment, the hollow hole 10a of the hub 10 has a larger diameter than an outer diameter of the main shaft 8. The main shaft 8 is inserted through the hollow hole 10a of the hub 10 and is coupled with an inner peripheral surface of the hub 10 through e.g. spline coupling. It should be noted that the hub 10 may have a smaller diameter than the outer diameter of the main shaft so that the hub 10 can be inserted into the main shaft 8 and is coupled with an inner peripheral surface of the main shaft 8 through e.g. spline coupling. Alternatively, the main shaft 8 and the hub 10 may be integrally coupled with each other by e.g. welding.

The rim 14 is formed in a cylindrical shape extending in the axial direction C. The rim 14 has a smaller axial width (height H) than an axial dimension of the hub 10. The rim 14 is formed on the outer peripheral side of the gear 1. That is, the rim 14 is formed so as to have a larger diameter than that of the hub 10. In this embodiment, the outer diameter of the rim 14 is about 3 times as large as that of the hub 10, and the height (axial dimension) of the rim 14 is about ⅓ of the height of the hub 10. It should be noted that the size relationship between the rim 14 and the hub 10 is not limited to this. The rim 14 has an outer peripheral surface formed with external teeth 12. The external teeth 12 are in the form of a helical gear. It should be noted that forms of the external teeth 12 are not limited to this configuration.

The gear web 16 couples the hub 10 and the rim 14. The gear web 16 supports engagement load on the external teeth 12 and transmits the load from the external teeth 12 to the hub 10. The gear web 16 includes: a first web 18 on an upper side which obliquely extends upward (toward the one side in the axial direction C) from the rim 14 to the hub 10; and a second web 20 on a lower side which obliquely extends downward (toward the other side in the axial direction C) from the rim 14 to the hub 10. That is, the first web 18 extends upward and radially inward from the rim 14 to the hub 10. The second web 20 extends downward and radially inward from the rim 14 to the hub 10.

The gear web 16 has a general shape, i.e., a virtual shape connecting the first web 18 and the second web 20, with two circular truncated cones being combined such that bases of the truncated cones are faced to each other. Specifically, each of the bases is a plane that is perpendicular to the axial direction C, and two respective virtual vertexes are located on opposite sides of the axial direction C with the bases being interposed therebetween.

In this embodiment, in the cross section shown in FIG. 1, the first web 18, the second web 20 and the hub 10 cooperate together to define a triangle having a base defined by a circumferential wall of the hub 10. The angle defined by the first web 18 and the circumferential wall of the hub 10 (the axial direction C) is 90° or smaller. Similarly, the angle defined by the second web 20 and the circumferential wall of the hub 10 (the axial direction C) is 90° or smaller. In this embodiment, although the first web 18 and the second web 20 are linearly shaped in the cross section shown in FIG. 1, they may be slightly curved in the axial direction C.

Figure 2:
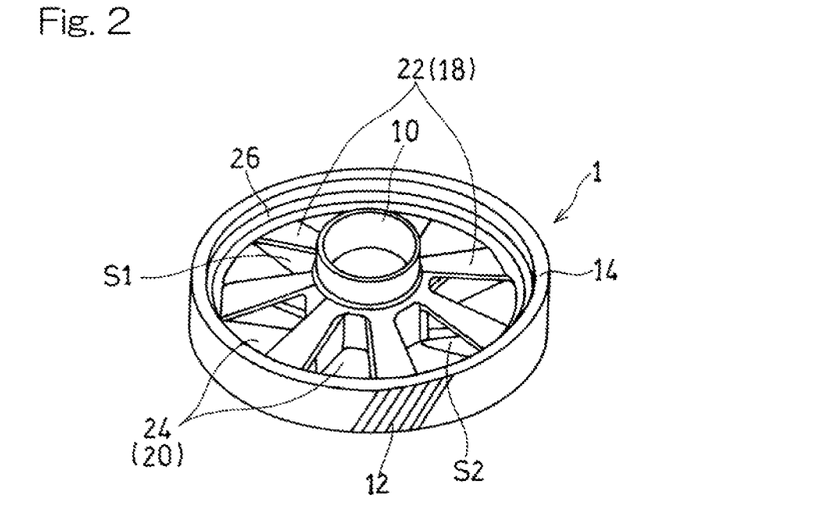
FIG. 2 is a perspective view of the gear.
Figure 3:
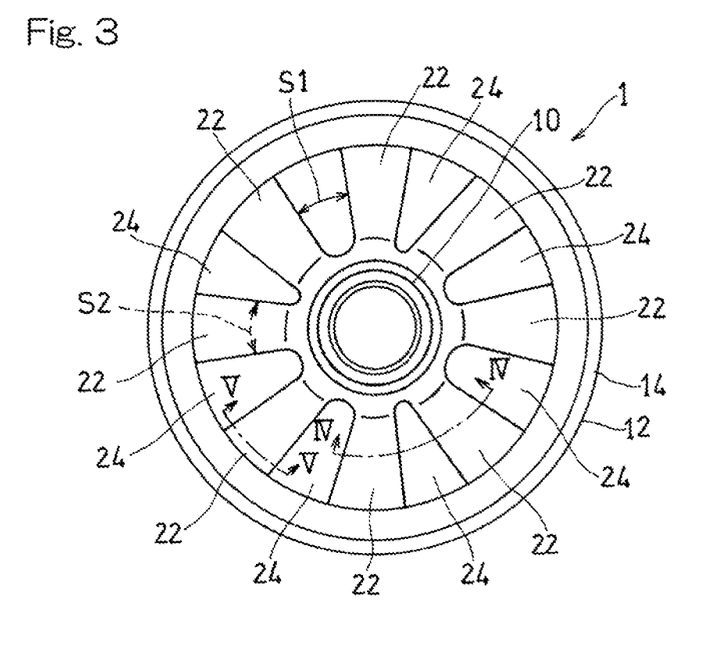
FIG. 3 is a plan view of the gear.

FIG. 2 is a perspective view of the gear 1. FIG. 3 is a plan view of the gear 1 when viewed from the one side of the axial direction C (from above). As shown in FIG. 2, the first web 18 includes a plurality of first web pieces 22 formed so as to be spaced apart in a circumferential direction. The second web 20 includes a plurality of second web pieces 24 formed so as to be spaced apart in the circumferential direction. There are the same number (8, in this embodiment) of the first web pieces 22 on the upper side and the second web pieces 24 on the lower side. The first web pieces 22 and the second web pieces 24 suppress deformation of the rim 14.

As shown in FIG. 1, the first web pieces 22 and the second web pieces 24 are separated from each other in the axial direction C, except for connection portions to the rim 14 on the outer side. Specifically, an entirety of the first web pieces 22 on the upper side is separated above with respect to an entirety of the second web pieces 24 on the lower side, except for the connection portions to the rim 14 on the outer side. The entirety of the second web pieces 24 on the lower side is separated below with respect to the entirety of the first web pieces 22 on the upper side, except for the connection portions to the rim 14 on the outer side.

As shown in FIG. 3, the first web pieces 22 and the second web pieces 24 are alternately arranged in the circumferential direction and are located at mutually different circumferential positions or circumferential portions different to each other. Specifically, the respective first web pieces 22 are arranged so as to be separated from each other at intervals S1 in the circumferential direction. The respective second web pieces 24 are also arranged so as to be separated from each other at intervals S2 in the circumferential direction. When viewed from the axial direction C, the second web pieces 24 are arranged between the adjacent first web pieces 22, 22, and the first web pieces 22 are arranged between the adjacent second web pieces 24, 24. In this embodiment, the respective first web pieces 22 are arranged at equal intervals in the circumferential direction. Similarly, the respective second web pieces 24 are also arranged at equal intervals in the circumferential direction.

Therefore, the gear web 16 has a repeated alternate arrangement, along the circumferential direction, of the first web piece 22 on the upper side, the second web piece 24 on the lower side, the first web piece 22 on the upper side, and the second web piece 24 on the lower side. In other words, the first web pieces 22 and the second web pieces 24 are arranged so as to be separated from each other in the axial direction C, except for the connection portions to the rim 14 on the outer side, and are provided so as not to overlap with each other when viewed from the axial direction C.

Figure 4:
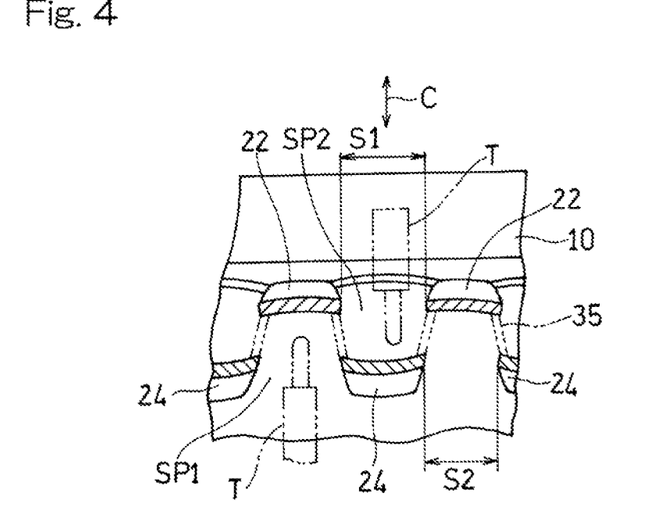
FIG. 4 is a sectional view taken along line Iv-Iv in FIG. 3.

In the gear 1 of this embodiment which has such a configuration, as shown in FIG. 4, open spaces SP1 opened in the axial direction C are defined below (i.e., on the other side in the axial direction C with respect to) the first web pieces 22 on the upper side. Also, open spaces SP2 opened in the axial direction C are defined above (i.e., on the one side in the axial direction C with respect to) the second web pieces 24 on the lower side. In other words, the first web pieces 22 on the upper side as a whole are exposed through the intervals S2 when viewed from below (i.e., the other side in the axial direction C). The second web pieces 24 on the lower side as a whole are exposed through the intervals S1 when viewed from above (i.e., the one side in the axial direction C).

Figure 5:
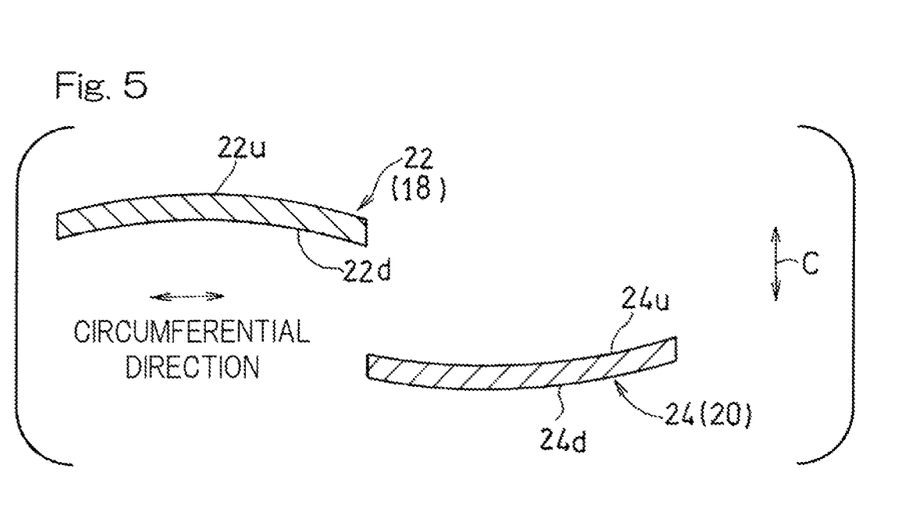
FIG. 5 is a sectional view taken along line v-v in FIG. 3.

Each of the first web pieces 22 and the second web pieces 24 has a plate-like flat shape. As shown in FIG. 5, each of the first web pieces 22 has a curved shape that is elongated in the circumferential direction and slightly projects upward in the cross section along the circumferential direction. Each of the second web pieces 24 has a curved shape that slightly projects downward in the cross section along the circumferential direction. The respective web pieces 22, 24 have such curved shapes because these web pieces 22, 24 form conical surfaces around the hub 10, as can be seen from FIG. 2. As long as the first web pieces 22 and the second web pieces 24 have circumferentially elongated shapes in the cross section along the circumferential direction, their cross-sectional shapes are not limited to the above-mentioned curved shapes and may be, for example, a rectangular shape elongated in the circumferential direction.

Alternatively, the first web pieces 22 may have, in the cross section along the circumferential direction, a linearly-shaped lower edge 22d at the other side (the lower side) in the axial direction C and a curved upper edge 22u that slightly projects upward, on the one side (the upper side) in the axial direction C. Similarly, the second web pieces 24 may have, in the cross section along the circumferential direction, a linearly-shaped upper edge 24u on the one side (the upper side) in the axial direction C and a curved lower edge 24d that slightly projects downward, on the other side (the lower side) in the axial direction C. It should be noted that the respective first web pieces 22 have the same shape, and the respective second web pieces 24 also have the same shape.

The first web pieces 22 and the second web pieces 24 have a thickness t that is about a maximum value at which deformation due to the engagement of the external teeth 12 of the rim 14 can be suppressed to an acceptable degree. Where the thickness t of the web pieces 22, 24 is too large, that leads to increased weight. In contrast, where the thickness t of the first and second web pieces 22, 24 is too small, deformation of the rim 14 cannot be suppressed due to insufficient rigidity. In this embodiment, the first web pieces 22 and the second web pieces 24 have mutually different thicknesses t in accordance with axial load applied from the external teeth (helical gear) 12. The external teeth 12 of this embodiment are in the form of a helical gear in which load is concentrated to the one side of the axial direction C (to the lower side, in this embodiment). Thus, in this embodiment, the thickness t of the second web pieces 24 on the lower side is larger than the thickness t of the first web pieces 22 on the upper side.

As shown in FIG. 3, the respective first web pieces 22 have the same shape, when viewed from the axial direction C. Similarly, the respective second web pieces 24 also have the same shape. On the other hand, the first web pieces 22 and the second web pieces 24 have mutually different shapes, when viewed from the axial direction C. That is, their shapes differ in the intervals S1, S2. In the circumferential direction, the first web pieces 22 are formed so as to be wider than the second web pieces 24. In addition, the first web pieces 22 and the second web pieces 24 have an increasing circumferential width dimension from the hub 10 to the rim 14 (radially outward), when viewed from the axial direction C. In this embodiment, the adjacent first web pieces 22 and second web pieces 24 are arranged with substantially no space in the circumferential direction, when viewed from the axial direction C. However, there may be spaces in the circumferential direction between the adjacent first web pieces 22 and the second web pieces 24.

As shown in FIG. 1 and FIG. 2, the rim 14 includes an annular flange 26 that products radially inward. The flange 26 is formed in the vicinity of an intermediate part of the rim 14 in the axial direction C. It should be noted that the position where the flange 26 is formed is not limited to this position and may be suitably selected in accordance with load condition in the gear 1. Although the flange 26 extends in the radial direction in this embodiment, the flange may obliquely extend radially inward toward the one side or the other side in the axial direction, or the inclination angle may be changed in the middle. The flange 26 has a radially inner end portion 26a to which radially outer end portions 22a of the first web pieces 22 and radially outer end portions 24a of the second web pieces 24 are connected as shown in FIG. 1. The flange 26 enhances the rigidity of the rim 14, whereby the flange 26 suppresses periodic change in deformation of the rim 14 due to difference in rigidity of the first web pieces 22 and the second web pieces 24. Thus, stable tooth contact of the external teeth 12 can be achieved during rotation of the gear 1.

Preferably, first connection portions 28 of the first web pieces 22 to the flange 26 of the rim 14 and second connection portions 30 of the second web pieces 24 to the flange 26 of the rim 14 are located at the same position in the axial direction C. The expression "the same position" used herein means that their axial positions are exactly the same or are offset by 5% or less of an axial width (height H) of the rim 14. The first web pieces 22 and the second web pieces 24, however, are not necessarily connected to the flange 26 at the same position in the axial direction C.

The flange 26 may be omitted. In such a case, the radially outer end portions 22a of the first web pieces 22 and the radially outer end portions 24a of the second web pieces 24 are connected to the inner peripheral surface of the rim 14. Even in this case, it is preferred that the connection portions 28 of the first web pieces 22 to the rim 14 and the connection portions of the second web pieces 24 to the rim 14 are located at the same position in the axial direction.

The third connection portions 32 of the first web pieces 22 to the hub 10 and the fourth connection portions 34 of the second web pieces 24 to the hub 10 are separated in the axial direction C. Specifically, in the axial direction C, the third connection portions 32 and the fourth connection portions 34 are located on opposite sides with the first connection portions 28 and the second connection portions 30 being interposed therebetween. An axial length L1 between the third connection portions 32 and the fourth connection portions 34 is preferably 80% or more of the height H of the rim 14. In this embodiment, the axial length L1 is substantially the same as the height H of the rim 14. The axial length L1 is the maximum value for the axial intervals between the first web pieces 22 and the second web pieces 24.

A method of manufacturing a gear 1 of this embodiment will be described. The gear 1 of this embodiment is obtained by forging to form a rough shape of the gear and then finishing through machine processing. In this process, the first web pieces 22 and the second web pieces 24 are processed by, for example, turning or rotary cutting using an endmill (milling).

Figure 6:
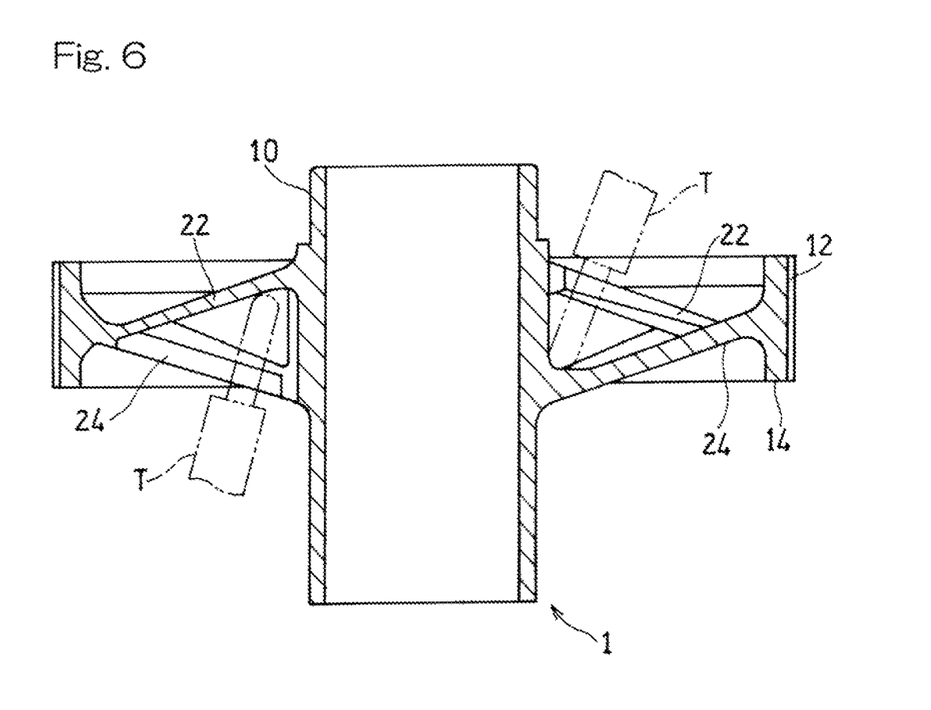
FIG. 6 is a sectional view illustrating a manufacturing process of the same gear.

Milling is performed by use of a tool T such as an endmill from above and below, as shown in FIG. 6. As mentioned above, the first web pieces 22 and the second web pieces 24 are arranged so as to be separated from each other in the axial direction C, except for the connection portions to the rim 14 on the outer side, and are provided so as not to overlap with each other when viewed from the axial direction C. That is, as shown in FIG. 3, the spaces SP1, SP2 are defined below the first web pieces 22 on the upper side and above the second web pieces 24 on the lower side, respectively. Further, the first web pieces 22 on the upper side as a whole are exposed through the intervals S2 when viewed from below, and the second web pieces 24 on the lower side as a whole are exposed through the intervals S1 when viewed from above.

Thus, when the underside of the first web pieces 22 is processed, the tool T can access the underside from below. When the topside of the second web pieces 24 is processed, the tool T can access the topside from above. That is, the first web pieces 22 and the second web pieces 24 can be easily formed by milling by use of the tool T. In this way, the gear 1 can be formed in an integrated structure that can be machined processed. As a result, it is possible to reduce the number of parts and thereby to reduce the manufacturing cost of the gear 1.

The above configuration makes it possible to ensure rigidity of the gear 1 thanks to the first web 18 and the second web 20 that obliquely extend in mutually different directions from the rim 14 to the hub 10, as shown in FIG. 1. In addition, the external teeth 12 are supported by the rim 14; periodic change in deformation of the rim 14 during rotation of the gear is suppressed by the flange 26 of the rim 14; and the degree of deformation of the rim 14 is suppressed by the first web pieces 22 and the second web pieces 24. This makes it possible to provide wide tooth contact of the external teeth 12, thereby improving durability of the external teeth 12.

The first web pieces 22 and the second web pieces 24 are alternately provided in the circumferential direction. That is, the first web pieces 22 are arranged at the intervals S1 in the circumferential direction, and the second web pieces 24 are arranged at the intervals S2 in the circumferential direction.

Thus, weight increase of the gear web 16 is suppressed, whereby the weight of the gear 1 can be reduced. Moreover, since the first web pieces 22 and the second web pieces 24 can be separately formed through machine processing in this embodiment, they can be easily formed in a suitable shape in accordance with a necessary degree of deformation and/or a direction of load. As a result, it is possible to reduce the weight while ensuring necessary rigidity. In addition, since it is not necessary to use a fastening member or to perform welding as in the conventional example in which the web is divided, the number of parts or steps is reduced. Thus, it is possible to manufacture a highly rigid gear at low cost.

As shown in FIG. 5, the first web pieces 22 and the second web pieces 24 has a circumferentially elongated shape in the cross section along the circumferential direction. Thus, it is possible to ensure rigidity against radial load and circumferential load on the first web pieces 22 and the second web pieces 24.

As shown in FIG. 1, the entirety of the first web pieces 22 on the upper side excluding the connection portions 22a to the rim 14 is separated above with respect to the entirety of the second web pieces on the lower side excluding the connection portions 24a to the rim 14. Thus, the tool T (FIG. 4) can approach from above or below to easily perform milling to the first web pieces 22 and the second web pieces 24. In addition, since the first and second web pieces 22, 24 obliquely extend so as to be separated from each other in the axial direction, the rigidity of the gear 1 can be ensured.

The rim 14 has the flange 26 that protrude radially inward, and the radially outer end portions 22a, 24a of the first web pieces 22 and the second web pieces 24 are connected to the flange 26. Thus, the rigidity of the rim 14 is enhanced, whereby periodic change in deformation is suppressed. Moreover, since the first web pieces 22 and the second web pieces 24 have radial lengths that are shorter by a length of the flange 26, a processing amount of milling is reduced. As a result, the manufacturing cost of the gear can be reduced.

Furthermore, the first connection portions 28 of the first web pieces 22 to the rim 14 and the second connection portions 30 of the second web pieces 24 to the rim 14 are located at the same position in the axial direction. Thus, the first web pieces 22 and the second web pieces 24 cooperate together to define triangles each having a vertex at the connection portions 28, 30 to the rim 14 in the cross section shown in FIG. 1, thereby enhancing the rigidity of the gear 1. The maximum value L1 of the axial intervals between the first web pieces 22 and the second web pieces 24 is substantially the same as the axial width (height) H of the rim 14. Thus, the dimension (maximum value L1) of the bases of the triangles is made larger, thereby further enhancing the rigidity of the gear 1.

The external teeth 12 of this embodiment are in the form of a helical gear. Although a helical gear is subjected to a load in an axial direction (downward in this embodiment), a highly rigid gear according to the above configuration can sufficiently bear such a load. Further, the first web pieces 22 and the second web pieces 24 have different thicknesses from each other in accordance with a magnitude of axial load to be applied from the helical gear. Specifically, the second web pieces 24 on the lower side has a larger thickness than that of the first web pieces 22 on the upper side. Thus, it is possible to suppress weight increase while ensuring necessary rigidity.

The external teeth 12 may be in the form of a bevel gear, instead of a helical gear. Although a bevel gear is also subjected to a concentrated load on one side in an axial direction, a highly rigid gear according to the above configuration can sufficiently bear such a load. The gear according to the above configuration can have the first web pieces 22 and the second web pieces 24 with mutually different thicknesses in accordance with axial load to be applied from the bevel gear. Thus, it is possible to suppress weight increase while ensuring necessary rigidity.

Figure 7:
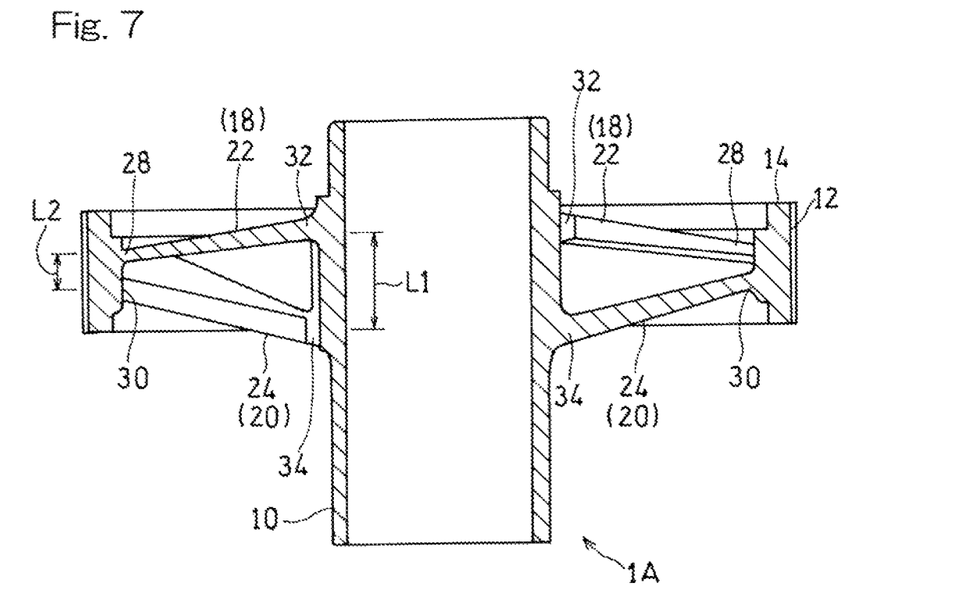
FIG. 7 is a longitudinal sectional view of a gear according to a second embodiment of the present invention.

FIG. 7 shows a gear 1A according to a second embodiment of the present invention. In the second embodiment, the first connection portions 28 of the first web pieces 22 to the rim 14 and the second connection portions 30 of the second web pieces 24 to the rim 14 are separated from each other in the axial direction. Accordingly, the entirety of the first web pieces 22 including the first connection portions 28 and the entirety of the second web pieces 24 including the second connection portions 30 are separated from each other in the axial direction. In the second embodiment, an axial length L2 between the first connection portions 28 and the second connection portions 30 is smaller than the axial length L1 between the third connection portions 32 and the fourth connection portions 34. That is, in the cross section shown in FIG. 7, trapezoids are formed, each trapezoid having vertexes at the first connection portion 28, the second connection portion 30, the third connection portion 32 and the fourth connection portion 34. Other features of the second embodiment are the same as those of the first embodiment.

According to the second embodiment, since the first connection portions 28 and second connection portions 30 are separated in the axial direction C, the first web pieces 22 and the second web pieces 24 provide an enhanced effect of suppressing deformation of the rim 14. In addition, this configuration allows the first web pieces 22 and the second web pieces 24 to be made shorter thanks to smaller inclination with respect to the radial direction, which makes it possible to suppress weight increase in the first and second webs 18, 20. As a result, the weight of the gear can be reduced.

Figure 8:
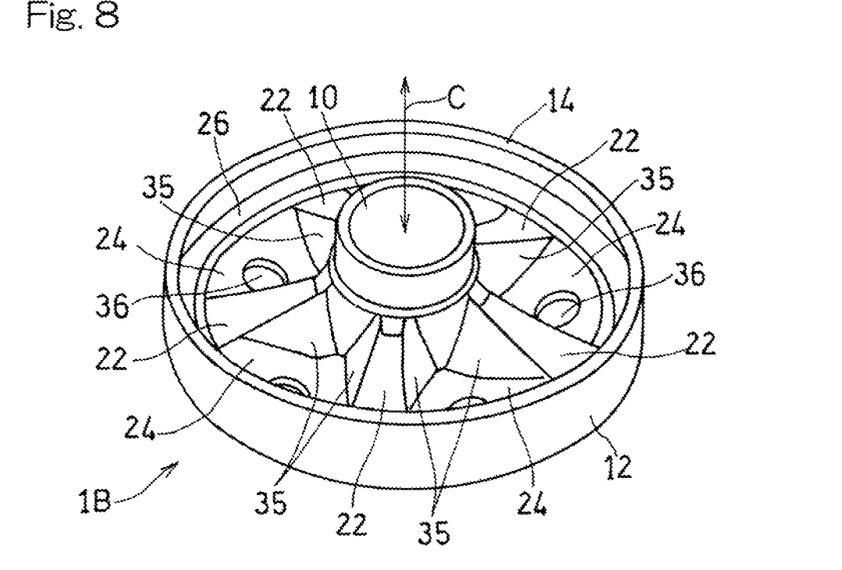
FIG. 8 is a perspective view of a gear according to a third embodiment of the present invention.

FIG. 8 shows a gear 1B according to a third embodiment of the present invention. In the third embodiment, side edge portions of the first web pieces 22 and side edge portions of the second web pieces 24 that are adjacent in the circumferential direction are connected by connection walls 35 extending in the axial direction C. The connection walls 35 are also shown in FIG. 4 by double dotted lines. In this embodiment, the second web pieces 24 are formed with lightening holes 36 in order to reduce the weight. Other features of the third embodiment are the same as those of the first embodiment. According to the third embodiment, the connection walls 35 further enhances the rigidity of the gear 1A. This makes it possible to achieve wide tooth contact of the external teeth 12, thereby enhancing durability of the external teeth 12.

The gear web structure of the gear according to the present invention is suitable for a large gear, in particular, a gear in which load is applied in an axial direction, such as a helical gear or a bevel gear. In such a gear, a gear web is important to enhance rigidity. The gear according to the present invention is, in particular, suitable for aircrafts, such as helicopter, in which weight reduction is demanded. In the above embodiments, since the description is made for the cases where a gear according to the present invention is applied to a helicopter, the axial direction C of the rotation shaft (main shaft) 8 coincides with the vertical direction. However, the axial direction of the rotation shaft according to the present invention is not limited to the vertical direction.

The present invention is not limited to the embodiments described above, and various additions, modifications, or deletions may be made without departing from the scope of the invention. For example, although the description is made for the cases where the gear is applied to a drive system of a helicopter in the above embodiments, a gear according to the present invention may be applied to other aircrafts besides the helicopter, as well as to other applications besides aircrafts. Application of a gear according to the present invention is not limited to the use in the speed reduction device. For example, it can be applied to a speed increase device.

The shapes of the first web pieces 22 and the second web pieces 24 are not limited to those described in the above embodiments. Although, in the above embodiments, the first and second web pieces 22, 24 have a trapezoid shape when viewed from the axial direction C, they may have a rectangular shape.

The respective first web pieces 22 or the respective second web pieces 24 preferably have the same shape in order to equalize load transmission. Also, for the same purpose, the intervals of the adjacent first web pieces 22 or the intervals of the adjacent second web pieces 24 are preferably the same. The shapes or the intervals of the first web pieces 22 or the second web pieces 24, however, are not necessarily the same and may be suitably changed.

Accordingly, such variants are included within the scope of the present invention.

REFERENCE NUMERALS 1, 1A, 1B . . . Gear
8 . . . Main shaft (rotation shaft)
10 . . . Hub
12 . . . External teeth
14 . . . Rim
18 . . . First web
20 . . . Second web
22 . . . First web pieces
22a . . . Radially outer end portion of the first web piece
24 . . . Second web pieces
24a . . . Radially outer end portion of the second web piece
26 . . . Flange
28 . . . First connection portion
30 . . . Second connection portion
35 . . . Connection wall
H . . . Axial width (height) of the rim

What is claimed is:

1. A gear comprising:
a hub provided on an inner peripheral side and configured to be connected to a rotation shaft;
a rim provided on an outer peripheral side and formed with external teeth;
a first web connecting the hub and the rim, the first web extending obliquely toward one side of the rotation shaft in an axial direction from the rim to the hub; and
a second web connecting the hub and the rim, the second web extending obliquely toward the other side of the rotation shaft in the axial direction from the rim to the hub, wherein
the first web includes a plurality of first web pieces formed so as to be spaced apart in a circumferential direction,
the second web includes a plurality of second web pieces formed so as to be spaced apart in the circumferential direction, and
the first web pieces and the second web pieces are alternately arranged in the circumferential direction and are located at mutually different circumferential positions.

2. The gear as claimed in claim 1, wherein each of the first web pieces and the second web pieces has a circumferentially elongated cross section along the circumferential direction.

3. The gear as claimed in claim 1, wherein an entirety of the first web pieces excluding connection portions to the rim is separated toward the one side in the axial direction with respect to an entirety of the second web pieces excluding connection portions to the rim.

4. The gear as claimed in claim 3, wherein the connection portions of the first web pieces to the rim are axially separated from the connection portions of the second web pieces to the rim.

5. The gear as claimed in claim 1, wherein the connection portions of the first web pieces to the rim and the connection portions of the second web pieces to the rim are located at the same position in the axial direction.

6. The gear as claimed in claim 1, wherein a maximum value of an axial interval between each of the first web pieces and each of the second web pieces is 80% or more of the axial width of the rim.

7. The gear as claimed in claim 1, wherein the first web pieces and the second web pieces that are adjacent in the circumferential direction are connected by connection walls extending in the axial direction.

8. The gear as claimed in claim 1, wherein the rim has a flange protruding radially inward, and
the flange is connected with radially outer end portions of the first web pieces and the second web pieces.

9. The gear as claimed in claim 1, wherein the external teeth are in the form of a helical gear.

10. The gear as claimed in claim 9, wherein the first web pieces and the second web pieces have different thicknesses from each other in accordance with axial load to be applied from the helical gear.

11. The gear as claimed in claim 1, wherein the external teeth are in the form of a bevel gear.

12. The gear as claimed in claim 11, wherein the first web pieces and the second web pieces have different thicknesses from each other in accordance with axial load to be applied from the bevel gear.

* * * * *